United States Patent
Maemura (10) Patent No.: US 6,880,521 B2
(45) Date of Patent: Apr. 19, 2005

(54) FUEL INJECTION CONTROL APPARATUS FOR IN-CYLINDER INJECTION TYPE INTERNAL COMBUSTION ENGINE AND FUEL INJECTION CONTROL METHOD

(75) Inventor: Jun Maemura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/692,723

(22) Filed: Oct. 27, 2003

(65) Prior Publication Data

US 2004/0154583 A1 Aug. 12, 2004

(30) Foreign Application Priority Data

Oct. 30, 2002 (JP) ......................................... 2002-315864

(51) Int. Cl.⁷ .............................................. F02D 41/06
(52) U.S. Cl. ....................... 123/305; 123/491; 701/105; 701/113
(58) Field of Search ................................. 123/305, 436, 123/491; 701/103, 104, 105, 113

(56) References Cited

U.S. PATENT DOCUMENTS 5,979,400 A * 11/1999 Nishide ....................... 123/305
6,209,515 B1 * 4/2001 Gotoh et al. ................. 123/305

FOREIGN PATENT DOCUMENTS

JP 8-319865 A 12/1996

* cited by examiner

Primary Examiner—Hai Huynh
(74) Attorney, Agent, or Firm—Kenyon & Kenyon (57) ABSTRACT

In response to start of cranking in an internal combustion engine by a starter, a fuel injection control starts. When an initial combustion of the fuel injected into the internal combustion engine is detected based on a rotational speed of a crankshaft, it is determined that the internal combustion engine in a warm-up period, and a control for reducing a fuel injection period is executed. When it is detected that the rotational speed of the crankshaft exceeds a predetermined rotational speed, it is determined that the internal combustion engine is in a start-up promotion period, and a control for extending the fuel injection period is executed.

16 Claims, 5 Drawing Sheets

FUEL INJECTION CONTROL APPARATUS FOR IN-CYLINDER INJECTION TYPE INTERNAL COMBUSTION ENGINE AND FUEL INJECTION CONTROL METHOD

INCORPORATION BY REFERENCE

The disclosure of Japanese Patent Application No. 2002-315864 filed on Oct. 30, 2002, including the specification, drawings and abstract are incorporated herein by reference in its entirety.

BACKGROUND OF THE INVENTION

1. Field of the Invention

The invention relates to a fuel injection control apparatus and method for an in-cylinder injection type internal combustion engine, and particularly, to an improvement in a fuel injection control mechanism operated upon start-up of the internal combustion engine.

2. Description of Related Art

Conventionally the fuel injection control apparatus of the aforementioned type has been disclosed in JP-A-8-319865. The apparatus disclosed in JP-A-8-319865 is structured to obtain a fuel injection start timing that allows the required fuel injection time period to be secured upon start-up of the engine based on the injection completion timing set in accordance with the operating state of the engine. Upon cold start of the engine, the apparatus allows to set the injection start timing during an exhaust stroke such that the quantity of the fuel required for the cold start is injected into the cylinder.

In the apparatus disclosed in JP-A-8-319865, if the fuel injection completion timing deviates from the crank angle range that allows injection of the fuel owing to the increase in the engine speed, the fuel injection valve is forcibly closed to interrupt the fuel injection so as to prevent the reverse flow of the residual gas in the cylinder to pass through the fuel injection valve.

The aforementioned apparatus disclosed in JP-A-8-319865 is capable of setting the injection start timing during the exhaust stroke upon cold start of the internal combustion engine so as to inject the fuel by the quantity required for the start-up. In this case, however, when the fuel injection completion timing deviates from the crank angle range that allows the fuel injection, the fuel injection is forcibly interrupted. This may cause the failure in injection of the required quantity of the fuel. In this apparatus, even if the injection start timing can be set during the exhaust stroke at the cold start of the engine, the quantity of the fuel required for the start-up cannot always be injected.

In the aforementioned case, it is difficult to complete the start-up of the engine at the cold state. The fuel injection for the start-up of the engine will be repeatedly performed. Especially in the start-up of the engine, the rate of the fuel subjected to the combustion to the fuel subjected to the injection into the cylinder becomes small. So the concentration of the fuel that is not combusted in the cylinder of the engine is increased. This may cause the spark plug to be covered with the fuel or smoldered with high possibility. Accordingly it becomes further difficult to start the engine.

SUMMARY OF THE INVENTION

It is an object of the invention to provide a fuel injection control apparatus and method for an in-cylinder injection type internal combustion engine, which allows good startability of the engine.

According to a first aspect of the invention, a fuel injection control apparatus for an in-cylinder injection type internal combustion engine for controlling a quantity of fuel to be directly injected into a cylinder upon start-up of the internal combustion engine is provided with a controller that extends an allowable crank angle range that allows the fuel injection within a predetermined period of time subsequent to an initial combustion of the fuel injected upon the start-up of the internal combustion engine. Accordingly the extended allowable crank angle range after passage of the predetermined period of time becomes larger than the allowable crank angle range within the predetermined period of time.

In the aforementioned aspect, the allowable crank angle range is reduced for a predetermined period of time so as to be shorter than the range after passage of the predetermined period of time. The aforementioned reduction in the crank angle range for the predetermined period of time may restrain the fuel injection quantity. This makes it possible to avoid the excessive increase in the fuel concentration within the cylinder as well as avoid the fuel injection at a crank angle at which the aforementioned covering or smoldering of the spark plug is likely to occur.

Within the aforementioned predetermined period of time, the temperature within the cylinder is increased in the heat of combustion of the fuel. After passage of the predetermined period of time, the fuel is likely to be atomized, which may prevent the spark plug from being covered nor smoldered. In the above-described structure, the allowable crank angle range is expanded after passage of the predetermined period of time such that injection of the fuel sufficient for start-up of the engine can be promoted. This makes it possible to secure good startability of the engine.

In accordance with the first aspect, the controller may set a fuel injection period within the predetermined period of time to the allowable crank angle range within the predetermined period of time.

In the aforementioned aspect, the fuel injection period within the predetermined period of time corresponds to the allowable crank angle range. This makes it possible to simplify the fuel injection control compared with the case where the fuel injection period is set based on calculation of the fuel injection quantity under the limitation of the allowable crank angle range. This makes it possible to effectively utilize the allowable crank angle range.

In accordance with the first aspect, the controller may set a fuel injection period after passage of the predetermined period of time to the extended allowable crank angle range.

In the aforementioned aspect, the longest possible period of time is set as the fuel injection period after passage of the predetermined period of time. Therefore, the allowable crank angle range can be effectively utilized. As the fuel injection period after passage of the predetermined period corresponds to the allowable crank angle range, the fuel injection control may be simplified compared with the case where the fuel injection period is set based on the calculation of the fuel injection quantity under the limitation of the allowable crank angle range.

In accordance with the first aspect, the controller may set the predetermined period of time to a period that is taken for an engine speed of the internal combustion engine to exceed a predetermined engine speed.

As the temperature within the cylinder increases after the initial combustion, the engine speed increases. Therefore, the engine speed after the initial combustion can be used as a parameter indicating the temperature of the cylinder.

According to the above-described aspect, the period of time supposed to be taken for reaching the temperature at which the aforementioned covering or smoldering is unlikely to occur can be obtained without detecting the temperature of the cylinder directly. Then the obtained period is set to the predetermined period of time.

In accordance with the above aspect, the controller may make the allowable crank angle range within the predetermined period of time variable in accordance with at least one of an operating environment and an operating state of the internal combustion engine upon the start-up thereof.

The aforementioned aspect makes it possible to determine the allowable crank angle range to be set in the predetermined period of time as an appropriate range based on at least one of an operating environment and an operating state of the engine at start-up.

In accordance with the above aspect, the controller may make the extended allowable crank angle range variable in accordance with at least one of the operating environment and the operating state of the internal combustion engine upon the start-up thereof.

Accordingly this makes it possible to set the expanded allowable crank angle range to an appropriate range based on at least one of the operating environment and the operating state of the engine at start-up.

In accordance with the above aspect, the controller may extend the allowable crank angle range prior to the predetermined period of time so as to be larger than the allowable crank angle range within the predetermined period of time.

In the aforementioned aspect, the allowable crank angle range prior to the predetermined period of time is expanded to be larger than the allowable crank angle range to be set within the predetermined period of time. Therefore, this makes it possible to promote combustion of the injected fuel upon start-up of the engine.

In accordance with a second aspect of the invention, a fuel injection control apparatus for an in-cylinder injection type internal combustion engine for controlling a fuel injection quantity upon start-up of the internal combustion engine is provided with a calculating device that calculates a command value for controlling the fuel injection quantity into a cylinder of the internal combustion engine, and a controller that executes a fuel injection control based on the calculated command value. The controller forcibly decreases the command value for controlling the fuel injection quantity for a predetermined period of time after an initial combustion of the fuel injected upon the start-up of the internal combustion engine, and stops the forcible decrease in the command value after passage of the predetermined period of time.

The aforementioned second aspect makes it possible to avoid the excessive increase in concentration of the fuel within the cylinder by controlling the command value indicating the fuel quantity so as to be forcibly decreased within the predetermined period of time. The aforementioned control makes it possible to perform the fuel injection at the crank angle other than the crank angle that is likely to cause the covering or smoldering of the spark plug.

Within the predetermined period of time, the temperature of the cylinder is increased in the heat of the fuel combustion. Therefore, the fuel is likely to be atomized after passage of the predetermined period of time, avoiding the covering and smoldering of the ignition plug. According to the aforementioned aspect, the control of the command value to decrease the fuel injection quantity is stopped after passage of the predetermined period of time so as to promote sufficient fuel injection for start-up of the engine. This makes it possible to secure good startability of the engine.

In accordance with a third aspect of the invention, a fuel injection control method for an in-cylinder injection type internal combustion engine for controlling a quantity of fuel to be directly injected into a cylinder upon start-up of the internal combustion engine, comprises the step of extending an allowable crank angle range that allows the fuel injection within a predetermined period of time subsequent to an initial combustion of the fuel injected upon the start-up of the internal combustion engine such that the extended allowable crank angle range after passage of the predetermined period of time becomes larger than the allowable crank angle range within the predetermined period of time.

In accordance with a fourth aspect of the invention, a fuel injection control method for an in-cylinder injection type internal combustion engine for controlling a fuel injection quantity upon start-up of the internal combustion engine, including steps of calculating a command value for controlling the fuel injection quantity into a cylinder of the internal combustion engine, and executing a fuel injection control based on the calculated command value. The command value for controlling the fuel injection quantity is forcibly decreased for a predetermined period of time after an initial combustion of the fuel injected upon the start-up of the internal combustion engine. The forcible decrease in the command value is stopped after passage of the predetermined period of time.

DETAILED DESCRIPTION OF PREFERRED EMBODIMENTS

An embodiment of a fuel injection control apparatus for an in-cylinder injection type internal combustion engine which is applied to a spark-ignition type internal combustion engine will be described referring to the drawings.

Figure 1:
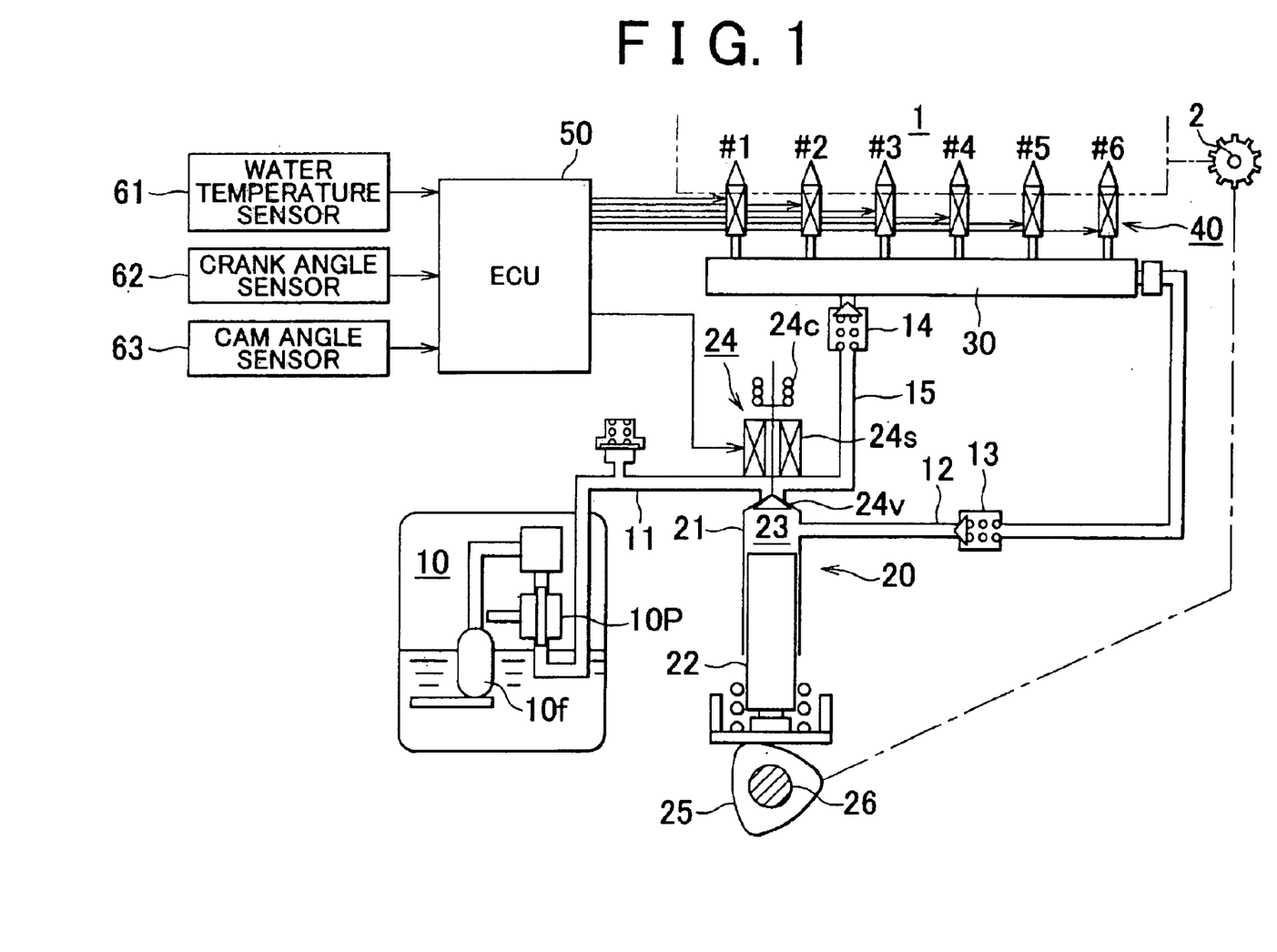
FIG. 1 is a schematic view of an embodiment of the fuel injection control apparatus for an in-cylinder injection type internal combustion engine according to the invention.

Referring to FIG. 1 showing a schematic view of the fuel injection control apparatus of the embodiment, an internal combustion engine 1 is formed as a spark ignition type internal combustion engine for directly injecting the fuel to each combustion chamber of 6 cylinders (#1 to #6). The internal combustion engine 1 includes a mechanism for supplying the fuel, that is, a fuel tank 10, a high pressure fuel pump 20 for increasing the pressure of the fuel that has been pumped up by the fuel tank 10, a delivery pipe 30 for storing the fuel pressurized by the high pressure fuel pump 20, and an injector 40 for directly injecting the fuel stored in the delivery pipe 30 into the combustion chamber.

The fuel tank 10 is connected to the high pressure fuel pump 20 via a low pressure side fuel passage 11. The fuel tank 10 is provided with a feed pump 10f and a pressure regulator 10p. The fuel in the fuel tank 10 that has been pumped up by the feed pump 10f is supplied as a low pressure fuel to the high pressure fuel pump 20 while being maintained at a predetermined pressure via the pressure regulator 10p. If the fuel pressure within the low pressure side fuel passage 11 exceeds a predetermined pressure, the low pressure fuel within the passage 11 is relieved into the fuel tank 10 by the pressure regulator 10p so as to maintain the pressure of the fuel to be discharged into the low pressure side fuel passage 11 at a predetermined pressure.

The high pressure fuel pump 20 is provided with a cylinder 21 and a plunger 22 which define a pressurization chamber 23 of the high pressure fuel pump 20. The pressurization chamber 23 is communicated with/cut off from the low pressure side fuel passage 11 under the control of an electromagnetic spill valve 24 of the high pressure fuel pump 20. The electromagnetic spill valve 24 is provided with an electromagnetic solenoid 24s, a coil spring 24c, and a valve body 24v. The coil spring 24c serves to urge the valve body 24v of the electromagnetic spill valve 24 toward the valve opening direction. The urging force of the coil spring 24c makes the valve body 24v to an open state when electric current is not applied to the electromagnetic solenoid 24s such that the low pressure side fuel passage 11 is communicated with the pressurization chamber 23. Meanwhile, when electric current is applied to the electromagnetic solenoid 24s, the valve body 24v is brought into the open state, the communication between the low pressure fuel passage 11 and the pressurization chamber 23 is interrupted.

The pressurization chamber 23 of the high pressure fuel pump 20 is connected to the delivery pipe 30 via a high pressure side fuel passage 12. A check valve 13 is provided in the middle of the high pressure side fuel passage 12. The check valve 13 serves to prevent the reverse flow of the fuel from the delivery pipe 30 to the pressurization chamber 23.

Referring to FIG. 1, the delivery pipe 30 is connected to the low pressure side fuel passage 11 via a relief valve 14 and a relief passage 15 such that the fuel pressure within the delivery pipe 30 is not excessively increased. The relief valve 14 opens when the fuel pressure within the delivery pipe 30 exceeds the set valve-opening pressure. The opening of the relief valve 14 returns the fuel within the delivery pipe 30 to the fuel tank 10 via the relief passage 15 and the low pressure side fuel passage 11.

The high pressure fuel pump 20, driven by the internal combustion engine 1, is mechanically connected to a crankshaft 2 as an output shaft thereof. More specifically, a cam 25 is mounted on a cam shaft 26 at the exhaust side, which is mechanically connected to the crankshaft 2. As the cam 25 rotates, the plunger 22 reciprocates within the cylinder 21.

The control system that executes various types of control with respect to the internal combustion engine 1, the high pressure fuel pump 20 and the like will be described.

The control system is formed of an electronic control unit (ECU) 50 that receives inputs of detection signals from various sensors for detecting operating states of the internal combustion engine 1. The sensors include a water temperature sensor 61 for detecting a temperature of a cooling water for the internal combustion engine, a crank angle sensor 62 for detecting a rotational speed of the crankshaft 2, a cam angle sensor 63 for detecting a rotating angle of the camshaft 2 and the like.

The ECU 50 executes a pressurization control of the fuel through the high pressure fuel pump 20 and a valve-opening control through the injector 40 based on the detection signals of the aforementioned sensors.

The pressurization control of the fuel and the injection control of the pressurized fuel to be supplied to the internal combustion engine 1 executed by the ECU 50 through the high pressure fuel pump 20 will be described.

The ECU 50 serves to execute the pressurization control for the fuel supplied to the delivery pipe 30 by controlling the electromagnetic spill valve 24 using the high pressure fuel pump 20 that brings the plunger 22 into reciprocating movement within the cylinder 21 while operating the internal combustion engine 1 such that the capacity of the pressurization chamber 23 varies. When the plunger 22 is moved by the rotating motion of the cam 25 in the direction to which the capacity of the pressurization chamber 23 is increased, the electromagnetic spill valve 24 is opened such that the fuel pumped up from the fuel tank 10 is admitted into the pressurization chamber 23. Meanwhile when the plunger 22 is moved by the rotating motion of the cam 25 in the direction to which the capacity of the pressurization chamber 23 is decreased, the electromagnetic spill valve 24 is closed at a predetermined timing. This makes it possible to interrupt the communication between the pressurization chamber 23 and the low pressure side fuel passage 11 such that the fuel pressure within the pressurization chamber 23 is increased. The fuel at the increased pressure is supplied to the delivery pipe 30 via the check valve 13.

The fuel held at a set pressure stored in the delivery pipe 30 is directly injected into each of the cylinders (#1 to #6) of the internal combustion engine 1 through the injector 40.

The fuel injection control at start-up of the engine of the embodiment will be described.

In the embodiment, the period from start-up of the internal combustion engine 1 to completion of the start-up is divided into three sections of the period, that is, an initial combustion section, a warm-up section, and a start-up promotion section. Each control executed within the aforementioned three sections of the period is different with one another. The initial combustion section of the period is taken until the moment just before the initial combustion of the fuel injected into the cylinder of the internal combustion engine 1. The warm-up section of the period is taken from the moment when the fuel injected into the cylinder of the engine 1 is initially combusted to the moment when the internal combustion engine 1 is warmed up for at least a predetermined period of time. The start-up promotion section of the period is taken from the warm-up of the internal combustion engine for a predetermined period to the completion of the start-up.

Figure 2:
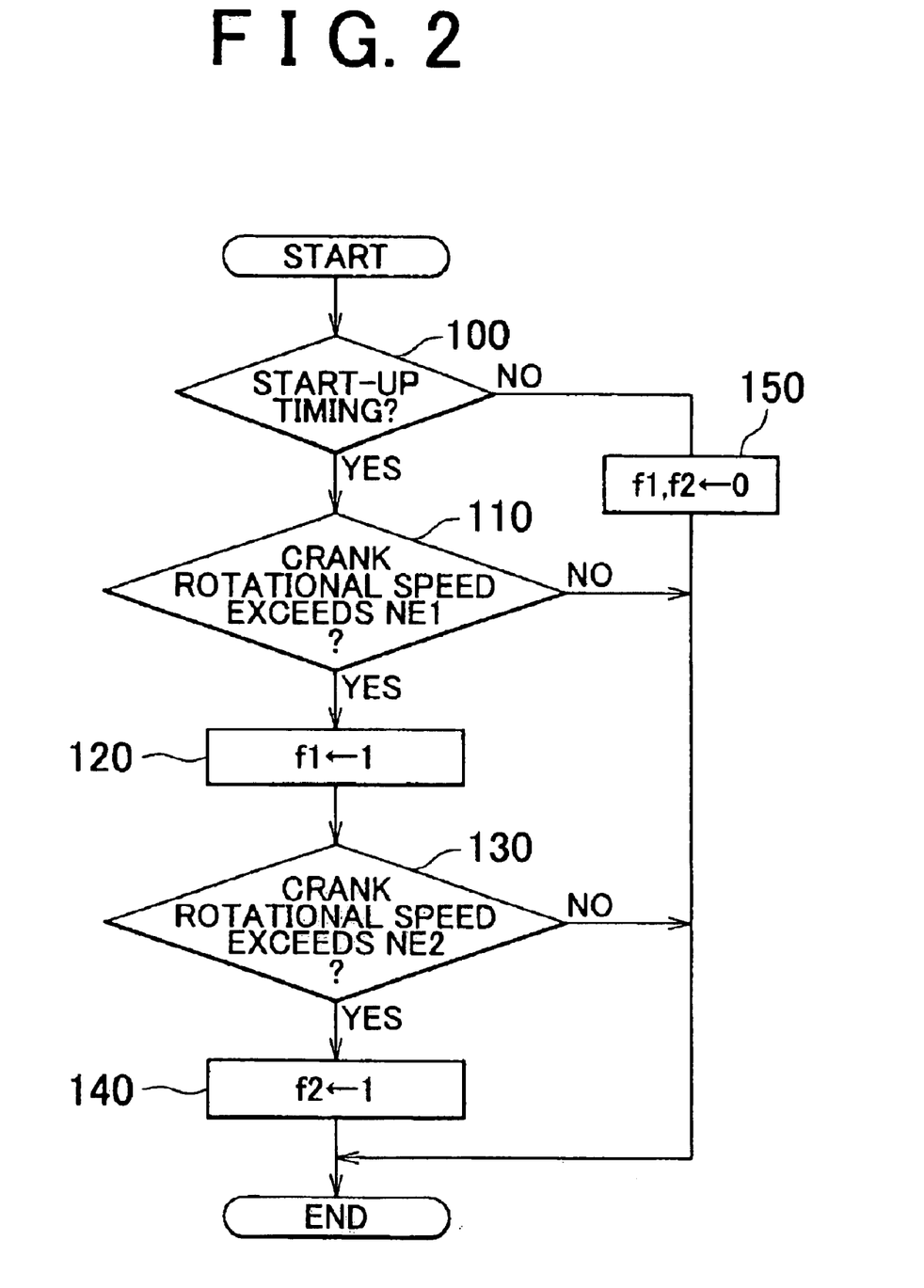
FIG. 2 is a flowchart representing a routine of a fuel injection control at start-up of the engine of an embodiment.

Referring to FIG. 2, described is a control routine for determining one of the aforementioned sections of the period executed in accordance with the operating state of the internal combustion engine. FIG. 2 is a flowchart indicating the process of setting one of those sections of the period as aforementioned, which is executed by the ECU 50 repeatedly at a predetermined cycle.

First in step 100 of the flowchart shown in FIG. 1, it is determined whether the internal combustion engine 1 is at a start-up timing. The start-up timing refers to the period that allows the internal combustion engine 1 to autonomously operate from the start of cranking of the internal combustion engine 1 in response to driving of the starter via an ignition switch (not shown). The timing that allows the internal combustion engine 1 to be autonomously operated corresponds to the timing taken until the rotating speed of the crankshaft 2 detected by the crank angle sensor 62 reaches the predetermined rotating speed.

If YES is obtained in step 100, that is, the engine is at the start-up timing, the process proceeds to step 110. In step 110, it is determined whether a rotational speed of the crankshaft 2 detected by the crank angle sensor 62 once becomes higher than a rotational speed NE1 from the start of cranking.

The rotational speed NE1 is used for detecting the initial combustion of the fuel injected into the cylinder of the internal combustion engine 1. It may be set to a value that is larger than the rotational speed of the crankshaft 2 resulting from cranking of the internal combustion engine 1 through the starter by a predetermined amount.

If YES is obtained in step 110, that is, it is determined that the rotational speed of the crank shaft 2 becomes larger than the rotational speed NE1, the process proceeds to step 120. In step 120, an initial combustion detection flag f1 is set to 1. The initial combustion detection flag f1 is set to 1 when the initial combustion of the fuel injected upon start-up of the internal combustion engine 1 is detected.

In step 130, it is determined whether the rotational speed of the crankshaft 2 once becomes higher than a rotational speed NE2 upon start of cranking. The rotational speed NE2 is used for determining whether the internal combustion engine 1 has been sufficiently in the warm-up state where no covering nor smoldering of the spark plug occurs in spite of extension of the fuel injection period. If YES is obtained in step 130, that is, it is determined that the rotational speed of the crankshaft 2 becomes higher than the rotational speed NE2, which indicates that the engine is in the start-up promotion section of the period, the process proceeds to step 140.

In step 140, a start-up promotion flag f2 is set to a value 1. This flag f2 is set to 1 when it is detected that the rotational speed of the crankshaft 2 exceeds the rotational speed NE2.

If NO is obtained in step 100, that is, it is determined that the internal combustion engine is not in the start-up timing, the process proceeds to step 150 where the initial combustion detection flag f1 and the start-up promotion flag f2 are set to 0, respectively.

When each process of steps 140, 150 is completed, or NO is obtained in each process of steps 110, 130, the routine ends. Each value of the initial combustion detection flag f1 and the start-up promotion flag f2 set in the aforementioned course of process may set the aforementioned three sections of period. If the flag f1 is set to 0, and the flag f2 is set to 0, this means that the engine is not in the initial combustion section of the period, nor in the start-up timing. If the flag f1 is set to 1, and the flag f2 is set to 0, this means that the engine is in the warm-up period. If the flag f1 is set to 1, and the flag f2 is also set to 1, this means that the engine is in the start-up promotion section of the period.

Figure 3:
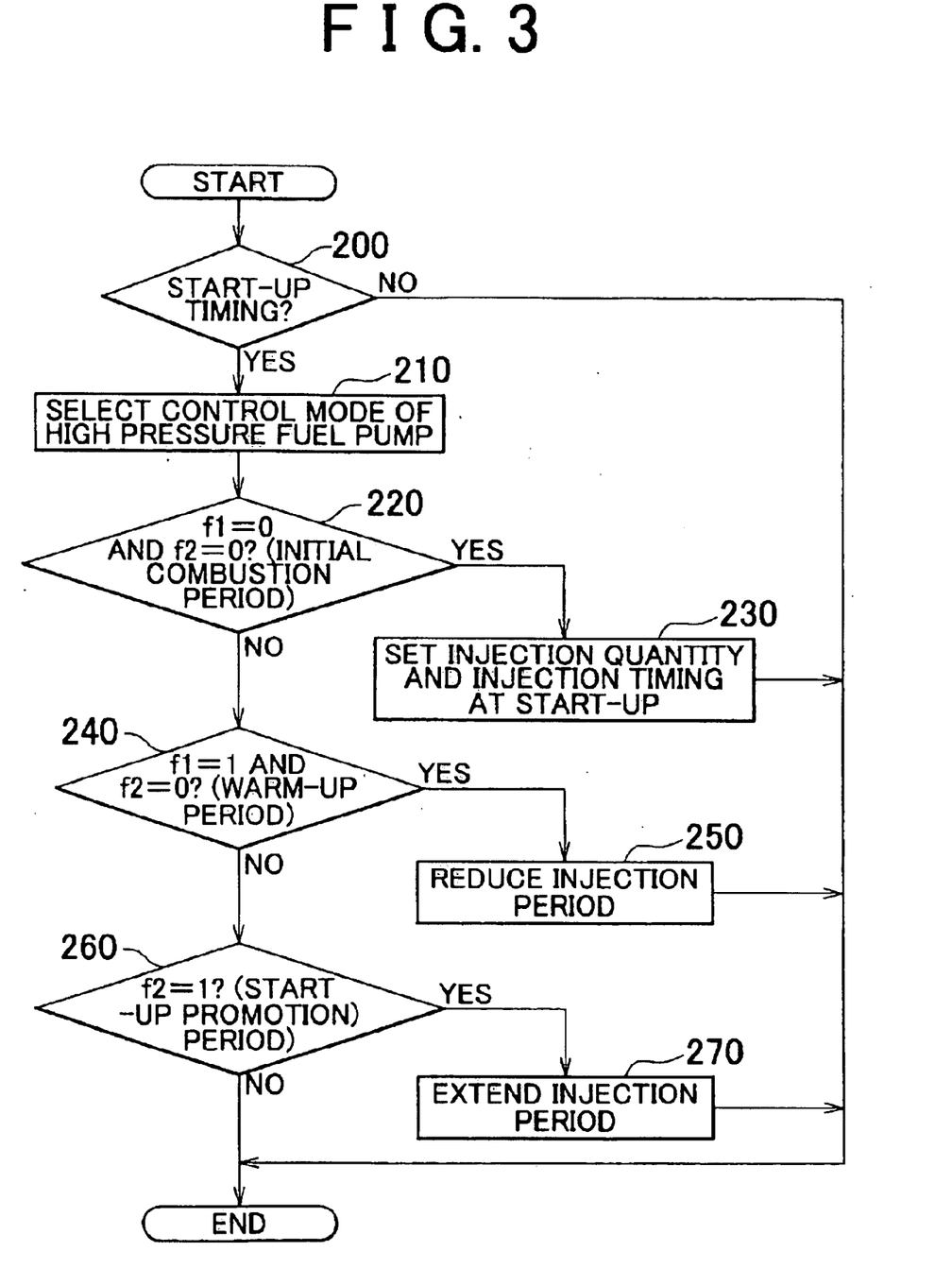
FIG. 3 is a flowchart representing a routine of the fuel injection control at start-up of the engine of the embodiment.

The control routine for executing the start-up control of the internal combustion engine for each of the above-described sections of the period will be described referring to FIG. 3. FIG. 3 is a flowchart of the control routine of the above-identified processes. The ECU 50 may also executes this process repeatedly at a predetermined cycle.

Referring to the flowchart of FIG. 3, in step 200, it is determined whether the internal combustion engine 1 is in the start-up timing like in step 100 of the flowchart of FIG. 2. If YES is obtained in step 200, that is, the internal combustion engine 1 is at the start-up timing, the process proceeds to step 210.

In step 210, the control mode of the high pressure fuel pump 20 is determined prior to execution of the fuel injection control of the internal combustion engine 1. It is determined whether execution of a fuel pressurization control by controlling the electromagnetic spill valve 24 upon start-up of the internal combustion engine 1 is required based on the detection results of the water temperature sensor 61. That is, a selection is made between the direct supply of the fuel pressurized by the feed pump 10f to the delivery pipe 30, and the supply of the fuel pressurized by the high pressure pump 20 to the delivery pipe 30.

The aforementioned determination is made based on a result of determination whether the temperature of the cooling water is equal to or lower than a predetermined temperature. If the cooling water temperature is equal to or lower than the predetermined temperature, the control of the electromagnetic spill valve 24 is not executed. When the electromagnetic spill valve 24 is not controlled, the fuel cannot be supplied from the fuel tank 10 to the delivery pipe 30 during closed state of the valve body 24v. Accordingly the supply quantity of the fuel to the delivery pipe 30 per rotation at a predetermined crank angle becomes larger than the quantity in the case where the electromagnetic spill valve 24 is not controlled.

The process then proceeds to step 220 and subsequent steps where the fuel injection control of the internal combustion engine 1 at start-up is executed. In step 220, it is determined whether both the flag f1 and the flag f2 are set to 0. If YES is obtained in step 220, that is, both the flags f1 and f2 are set to 0, it is determined that the start-up time is in the initial combustion section in which the initial combustion of the fuel injected at the start-up of the internal combustion engine 1 is not detected. The process then proceeds to step 230.

In step 230, the fuel injection quantity and the fuel injection timing at start-up are set. The aforementioned setting will be performed in the manner shown by FIG. 4. First the crank angle with respect to the Top Dead Center (TDC) of the piston (not shown) in each cylinder is obtained based on the detection signals of the crank angle sensor 62 and the cam angle sensor 63. The fuel injection quantity and the fuel injection timing in the cylinder into which the fuel is applied are calculated at a point when the piston advances at 450° CA with respect to the TDC thereof.

Figure 4:
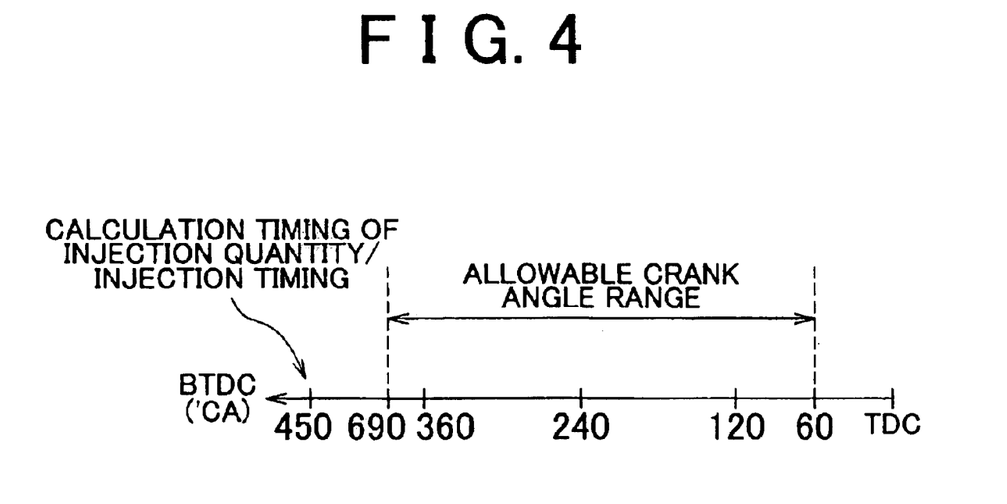
FIG. 4 is a chart representing setting of a fuel injection timing upon start-up of the engine of the embodiment.

The fuel injection quantity is calculated in accordance with the warm-up state of the internal combustion engine 1 (state of cold start). More specifically, the fuel injection quantity is calculated in accordance with the detection signal of the water temperature sensor 61. The calculation of the fuel injection quantity may be performed once at start-up of the engine rather than the calculation at every advancement at 450° CA in the cylinder into which the fuel is injected.

The fuel injection timing is set such that the calculated fuel injection quantity is established within the allowable crank angle range that allows a predetermined fuel injection. An end of the advancement side of the allowable crank angle range is set to a point in the latter stage of the exhaust stroke as the limit point at which a predetermined or larger quantity of the injected fuel is not discharged to the exhaust system for the internal combustion engine 1 prior to the combustion. Meanwhile an end of the retard side of the allowable crank angle range is set to a point in the earlier stage of the compression stroke as the limit point at which fuel injection to the cylinder of the internal combustion engine 1 is allowed. In this case, the advancement from 390° CA to 60° CA is set as the allowable crank angle range. However, the allowable crank angle range may be variable based on the detection signal of the water temperature sensor 1.

The fuel injection timing is set based on the rotational speed of the crankshaft 2 detected by the crank angle sensor 62 within the allowable crank angle range. Although the crank angle range is identical, the corresponding time may vary with the rotational speed of the crankshaft 2. It is preferable to avoid the fuel injection timing at the most advanced angle side or the most retarded angle side but at the middle section of the allowable crank angle range so as to prevent covering and smoldering of the spark plug.

The fuel injection control is executed based on the fuel injection quantity and the fuel injection timing which have been set. Then the ignition control is executed by the spark plug of the internal combustion engine 1 at a predetermined timing.

In step 240, it is determined whether the flag f1 is set to 1, and the flag f2 is set to 0. If YES is obtained in step 240, it is determined that the engine is in the warm-up section. The process then proceeds to step 250.

Figure 5A:
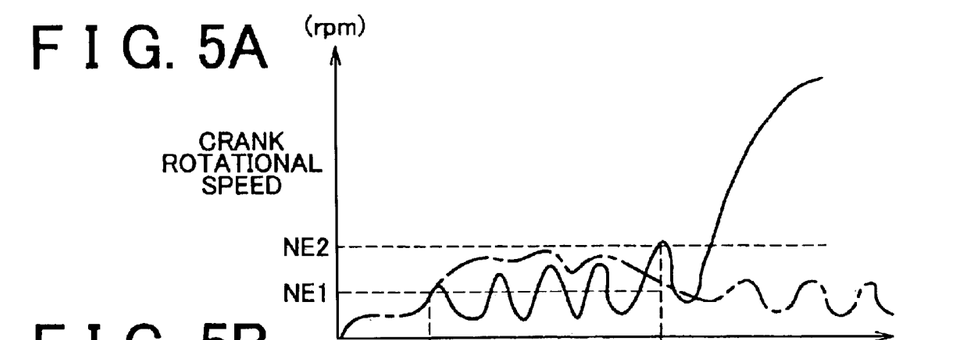
FIGS. 5A to 5C are timing charts each representing setting of the fuel-injection timing upon start-up of the engine of the embodiment.
Figure 5B:
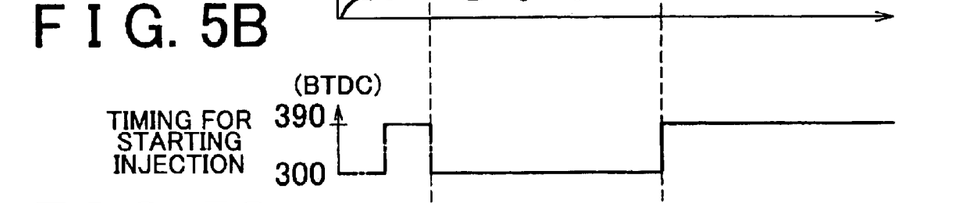
Figure 5C:
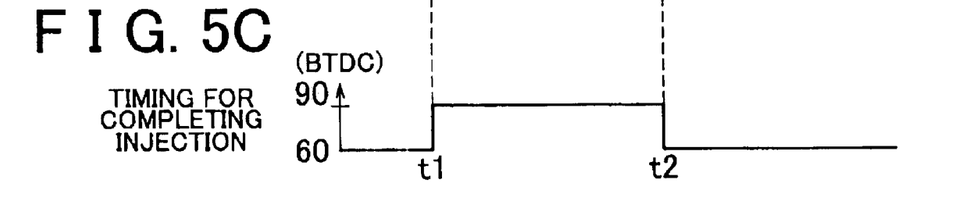

In step 250, the control for reducing the fuel injection period is executed according to the time chart shown in FIGS. 5A to 5C. The solid line of the time chart shown in FIG. 5A represents the change in the crank rotational speed according to the embodiment. FIG. 5B represents the period at which the fuel injection starts, and FIG. 5C represents the period of completion of the fuel injection.

As FIG. 5B shows, the fuel injection start timing is delayed with respect to the advancement limit of the allowable crank angle range shown in FIG. 4. As FIG. 5C shows, the fuel injection completion timing is advanced with respect to the retard limit of the allowable crank angle range shown in FIG. 4. Under the aforementioned control, the fuel injection quantity is not calculated. The period taken from the start of the fuel injection to the completion of the fuel injection as being set in FIGS. 5B and 5C is set as the fuel injection period.

The reduction in the fuel injection period makes it possible to execute the fuel injection control during the period other than the period at which the covering or smoldering of the spark plug is unlikely to occur. The period from 300° CA to 90° CA is exemplified as the fuel injection period as shown in FIGS. 5B and 5C. However, the fuel injection period may be set to be variable based on the detection signal of the water temperature sensor 61. In this case, it is preferable to set the fuel injection period to be variable in consideration with at least one of a condition where probability in causing covering or smoldering of the spark plug varies with the warm-up state (state of cold start) of the internal combustion engine, and a condition where the quantity of the fuel required to start-up varies with the warm-up state (state of cold start) of the internal combustion engine.

The fuel injection start timing or the fuel injection completion timing prior to the moment when the rotational speed of the crankshaft 2 becomes a predetermined rotational speed NE1 is set to be variable in accordance with the rotational speed of the crankshaft 2. Therefore, the allowable crank angle range is shown by a chain line in FIGS. 5B and 5C. Each of the fuel injection start timing and the fuel injection completion timing shown by a solid line in FIGS. 5B and 5C represents the command value, which does not necessarily correspond with the value indicating the actual fuel injection period. Even if the signal instructing to set the fuel injection period to "300° CA to 90° CA", the fuel injection control is executed in the fuel injection period in accordance with the instruction based on the fuel injection period calculated in the manner as shown in FIG. 4 prior to the time point t1.

In step 260, it is determined whether the flag f2 is set to 1. If YES is obtained in step 260, that is, the flag f2 is set to 1, it is determined that the start-up time is in the start-up promotion section. The process then proceeds to step 270.

In step 270, the fuel injection period is extended in the manner as shown in FIGS. 5A to 5C. That is, the fuel injection start timing is shifted to the advancement side as shown in FIG. 5B, and the fuel injection completion timing is shifted to the retarded side as shown in FIG. 5C. Then the fuel injection quantity is not calculated under the aforementioned control. The period from the fuel injection start timing to the fuel injection completion timing as being set in FIGS. 5B and 5C is set to the fuel injection period.

As the fuel injection period is extended after the determination is made with respect to the sufficient warm-up state of the internal combustion engine to effectively avoid the covering or smoldering of the spark plug, the fuel injection can be sufficiently performed while preventing the covering nor smoldering of the spark plug.

The period from 390° CA to 60° CA is exemplified as the fuel injection period shown in FIGS. 5B and 5C. However, the fuel injection period may be set to be variable based on the detection signal of the water temperature sensor 61. In this case, it is preferable to set the fuel injection period to be variable in consideration with at least one of a condition where probability of the covering or smoldering of the spark plug varies with the warm-up state (state of cold start) of the internal combustion engine, and a condition where the quantity of the fuel required to start-up varies with the warm-up state (state of cold start) of the internal combustion engine.

If NO is obtained in step 200, that is, it is determined that the internal combustion engine is not at the start-up timing, or each process in steps 230, 250, and 270 is completed, the control routine ends.

In this embodiment, when the initial combustion of the fuel injected into the cylinder of the internal combustion engine 1 is detected, the control for reducing the fuel injection period is executed (see FIGS. 5A to 5C, time point t1). This makes it possible to avoid excessive increase in the fuel concentration within the cylinder and avoid the fuel injection at the crank angle at which the covering or smoldering is likely to occur. The fuel injection control while reducing the fuel injection period makes it possible to warm up the internal combustion engine 1. When the crank rotational speed exceeds the rotational speed NE2, the internal combustion engine 1 is warmed up, and the fuel can be easily atomized. If it is determined that the covering or smoldering of the spark plug hardly occurs, the fuel injection period is extended (see FIG. 5A to 5C, time point t2). This makes it possible to promote the injection of the fuel sufficient to promote the start-up of the internal combustion engine 1.

In the case where the fuel injection control is executed in the manner as shown in FIG. 4 without reducing the fuel injection period, the crank rotational speed becomes as shown by the chain line of FIG. 5A, that is, the start-up may fail. Especially when the start-up of the engine is tried at an excessively low temperature, for example, at −15° C., it is difficult to succeed in the start-up operation. In this case, at the time point t1 and thereafter at which the initial combustion of the fuel injected into the cylinder of the engine 1 occurs, the actual time period corresponding to the allowable crank angle range (390° CA to 60° CA) is reduced resulting from the increase in the rotational speed of the crankshaft 2. When the actual time period is reduced, the fuel injection control is executed whole through the allowable crank angle range. Then the fuel injection may be continued even at the crank angle at which the covering or moldering of the spark plug is likely to occur. Accordingly, the concentration of the fuel that is not subjected to the combustion in the internal combustion engine 1 is increased.

This may cause misfire in the internal combustion engine, interfering with the start-up operation.

According to the embodiment, the following advantageous effects may be obtained.

(1) When the initial combustion of the fuel injected into the cylinder of the internal combustion engine 1 is detected, the control for reducing the fuel injection period is executed. This makes it possible to avoid the excessive increase in the fuel concentration in the cylinder as well as avoid the fuel injection at the crank angle at which the covering or moldering of the spark plug is likely to occur.

(2) When the crank rotational speed exceeds the predetermined rotational speed NE2, the internal combustion engine 1 is warmed up. This makes it possible to atomize the fuel. When it is determined that the covering or smoldering of the spark plug hardly occurs, the fuel injection period is extended. Thereafter, sufficient quantity of the fuel can be injected for the start-up operation of the internal combustion engine.

(3) The fuel injection timing is set in accordance with the crank rotational speed within the allowable crank angle range until the initial combustion of the fuel injected into the cylinder of the internal combustion engine 1 occurs. This makes it possible to inject the appropriate quantity of the fuel at the appropriate timing determined in accordance with the crank rotational speed.

The embodiment may be modified in the following way.

In the aforementioned embodiment, the control for reducing the fuel injection period is executed by a predetermined time period (warm-up period) from the detection of the initial combustion of the fuel injected into the cylinder of the internal combustion engine 1 to the moment when the crank rotational speed exceeds the rotational speed NE2. The starting point at which the fuel injection period is reduced is not limited, but may be set to an appropriate point after the detection of the initial combustion of the fuel injected into the cylinder of the internal combustion engine 1. For example, the starting point may be set to the one after the detection of the initial combustion of the fuel injected into the cylinder of the internal combustion engine 1, and the fuel injection timing is set for each of the cylinders in the manner as shown in FIG. 4.

In the aforementioned embodiment, the fuel injection period is extended after the crank rotational speed exceeds the predetermined rotational speed NE2. However, it is understood that the control is not limited to the aforementioned mode. The frequency of the combustion within each of cylinders in the internal combustion engine is obtained through monitoring of the crank rotational speed. The control for extending the fuel injection period may be executed when the obtained frequency becomes equal to or lower than the predetermined value. More specifically, the determination as to whether the internal combustion engine 1 is warmed up to the degree where the covering or smoldering of the spark plug hardly occurs may be made based on an appropriate parameter even under the control for extending the fuel injection period.

The control for reducing the fuel injection period immediately after the initial combustion (compared with the case after passage of a predetermined period) may be executed so as to restrain the covering or smoldering of the spark plug.

The fuel injection control mode executed until detection of the initial ignition of the fuel injected into the cylinder of the internal combustion engine 1 is not limited to the example as shown in FIG. 4. For example, the allowable crank angle range as indicated in FIG. 4 may be set as the fuel injection timing. In this case, the fuel injection quantity does not have to be calculated at an advanced crank angle of 450° CA.

In the aforementioned embodiment, the control for reducing the fuel injection timing is executed for a predetermined period (warm-up period). However, the allowable crank angle range where the fuel injection is allowed may be reduced in place of reducing the fuel injection period. In this case, the fuel injection quantity is calculated in the manner as shown in FIG. 4.

In the aforementioned embodiment, the control for extending the fuel injection period is executed after passage of the predetermined period (warm-up period) in which the fuel injection period is reduced. However, the allowable crank angle range where the fuel injection is allowed may be extended in place of extending the fuel injection period. In this case, the fuel injection quantity is calculated in the manner as shown in FIG. 4.

In the aforementioned embodiment, the control routine for the fuel injection shown in FIGS. 2 and 3 is always executed at the start-up operation. The control routine, however, may be executed upon establishment of at least one of the operating environment and the operating state of the internal combustion engine. For example, the control routine may be executed when the temperature of the cooling water is equal to or lower than a predetermined temperature.

The process for making the fuel injection period to be reduced or extended variable is executed based on the cooling water temperature in the aforementioned embodiment. However, such process may be executed arbitrarily so long as it is executed based on at least one of the operating state and the operating environment of the internal combustion engine.

In the aforementioned embodiment, the determination is made as to whether the high pressure fuel pump 20 is controlled based on the cooling water temperature upon the start-up control. However, such determination may be made based on the operating state or the operating environment of the internal combustion engine 1, which is derived from appropriate parameters. Alternatively the control of the high pressure fuel pump 20 may be interrupted upon the start-up control irrespective of the operating state or the operating environment of the internal combustion engine 1.

In the aforementioned embodiment, the fuel injection period or the allowable crank angle range is reduced in the predetermined period (warm-up period) to be set after the initial combustion of the fuel injected into the cylinder of the internal combustion engine. However, the instructing value used to control the fuel injection quantity may be forcibly reduced within the predetermined period. This makes it possible to avoid the excessive increase in the concentration of the fuel in the cylinder. The decrease in the command value of the fuel injection quantity makes it possible to perform the fuel injection at the crank angle other than the one at which the covering or the smoldering of the spark plug is likely to occur.

In the aforementioned embodiment, the ECU 50 serves to execute the control for extending the allowable crank angle range after passage of the predetermined (warm-up) period, or calculate the fuel injection quantity. However, an arbitrary hardware exclusively used for executing the above-described control may be employed in place of the ECU 50.

The fuel injection period or the timing for calculating the fuel injection period is not limited to the one as being exemplified in the embodiment. Further the structure of the high pressure fuel pump or the internal combustion engine is not limited to the one as shown in FIG. 1.

What is claimed is:

1. A fuel injection control apparatus for an in-cylinder injection type internal combustion engine for controlling a quantity of fuel to be directly injected into a cylinder upon start-up of the internal combustion engine, the fuel injection control apparatus comprising:

a controller that sets an allowable crank angle range that allows the fuel injection within a time period running from an initial combustion of the fuel injected upon the start-up of the internal combustion engine for a predetermined period of time, and sets an extended allowable crank angle range after passage of the predetermined period of time until the completion of start-up, the extended allowable crank angle range being larger than the allowable crank angle range.

2. The fuel injection control apparatus according to claim 1, wherein the controller sets a fuel injection period within the predetermined period of time to the allowable crank angle range within the predetermined period of time.

3. The fuel injection control apparatus according to claim 1, wherein the controller sets a fuel injection period after passage of the predetermined period of time to the extended allowable crank angle range.

4. The fuel injection control apparatus according to claim 1, wherein the controller sets the predetermined period of time to a period that is taken for an engine speed of the internal combustion engine to exceed a predetermined engine speed.

5. The fuel injection control apparatus according to claim 1, wherein the controller makes the allowable crank angle range within the predetermined period of time variable in accordance with at least one of an operating environment and an operating state of the internal combustion engine upon the start-up thereof.

6. The fuel injection control apparatus according to claim 1, wherein the controller makes the extended allowable crank angle range variable in accordance with at least one of an operating environment and an operating state of the internal combustion engine upon the start-up thereof.

7. The fuel injection control apparatus according to claim 1, wherein the controller extends the allowable crank angle range prior to the predetermined period of time so as to be larger than the allowable crank angle range within the predetermined period of time.

8. A fuel injection control apparatus for an in-cylinder injection type internal combustion engine for controlling a fuel injection quantity upon start-up of the internal combustion engine, the fuel injection control apparatus comprising:

a calculating device that calculates a command value for controlling the fuel injection quantity into a cylinder of the internal combustion engine; and a controller that executes a fuel injection control based on the calculated command value, wherein the controller: forcibly decreases the command value for controlling the fuel injection quantity for a predetermined period of time running from an initial combustion of the fuel injected upon the start-up of the internal combustion engine until a completion of start-up; and stops the forcible decrease in the command value after passage of the predetermined period of time.

9. A fuel injection control method for an in-cylinder injection type internal combustion engine for controlling a quantity of fuel to be directly injected into a cylinder upon start-up of the internal combustion engine, the fuel injection control method comprising the step of:

setting an allowable crank angle range that allows the fuel injection within a time period running from an initial combustion of the fuel injected upon the start-up of the internal combustion engine for a predetermined time period, and sets an extended allowable crank angle range after passage of the predetermined period of time until the completion of start-up, the extended allowable crank angle range being larger than the allowable crank angle range.

10. The fuel injection control method according to claim 9, wherein a fuel injection period within the predetermined period of time is set to the allowable crank angle range within the predetermined period of time.

11. The fuel injection control method according to claim 9, wherein a fuel injection period after passage of the predetermined period of time is set to the extended allowable crank angle range.

12. The fuel injection control method according to claim 9, wherein the predetermined period of time is set to a period that is taken for an engine speed of the internal combustion engine to exceed a predetermined engine speed.

13. The fuel injection control method according to claim 9, wherein the allowable crank angle range within the predetermined period of time is made variable in accordance with at least one of an operating environment and an operating state of the internal combustion engine upon the start-up thereof.

14. The fuel injection control method according to claim 9, wherein the extended allowable crank angle range is made variable in accordance with at least one of an operating environment and an operating state of the internal combustion engine upon the start-up thereof.

15. The fuel injection control method according to claim 9, wherein the allowable crank angle range prior to the predetermined period of time is extended so as to be larger than the allowable crank angle range within the predetermined period of time.

16. A fuel injection control method for an in-cylinder injection type internal combustion engine for controlling a fuel injection quantity upon start-up of the internal combustion engine, the fuel injection control method comprising the steps of:

calculating a command value for controlling the fuel injection quantity into a cylinder of the internal combustion engine; and executing a fuel injection control based on the calculated command value, wherein:

the command value for controlling the fuel injection quantity is forcibly decreased for a predetermined period of time running from an initial combustion of the fuel injected upon the start-up of the internal combustion engine until a completion of start-up; and the forcible decrease in the command value is stopped after passage of the predetermined period of time.

* * * * *